UNITED STATES PATENT OFFICE.

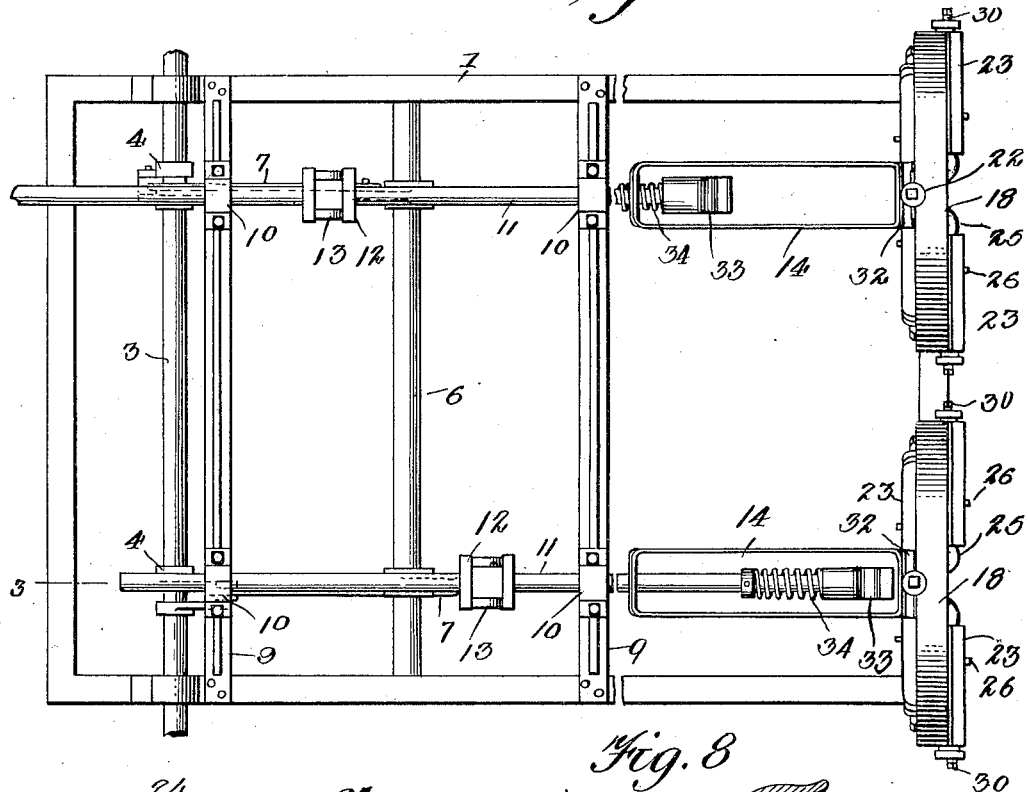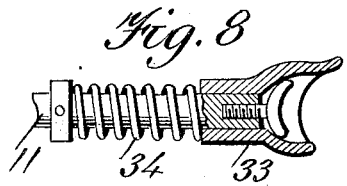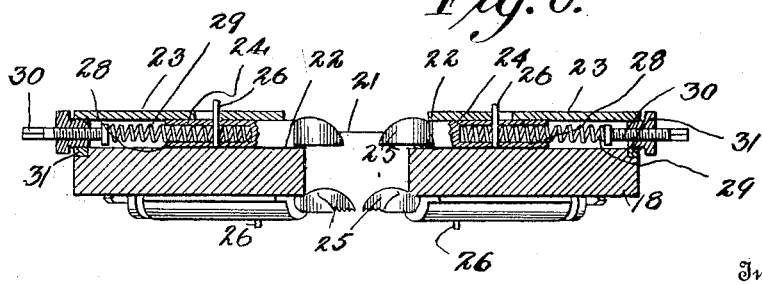

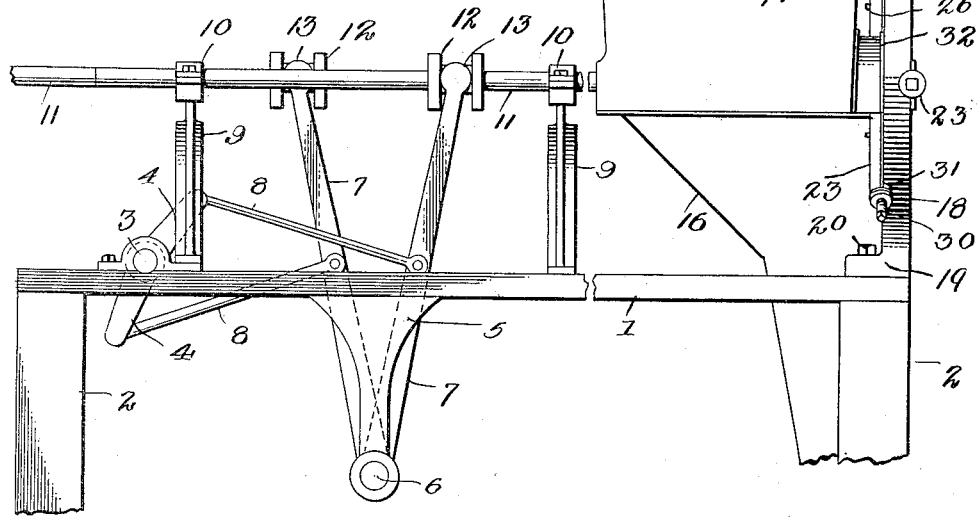
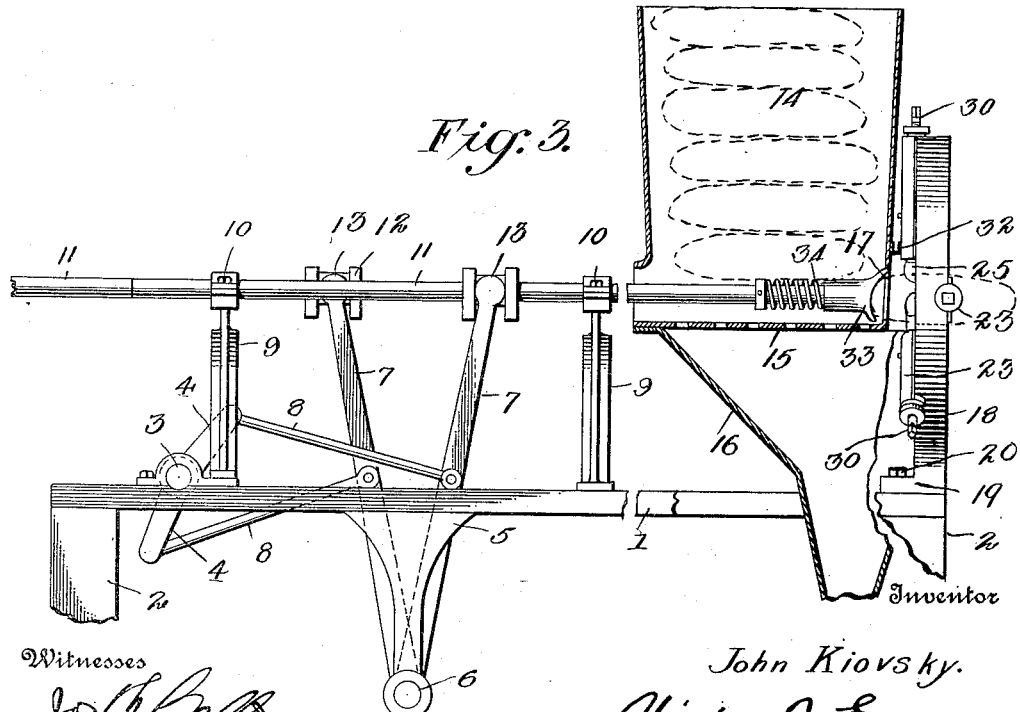

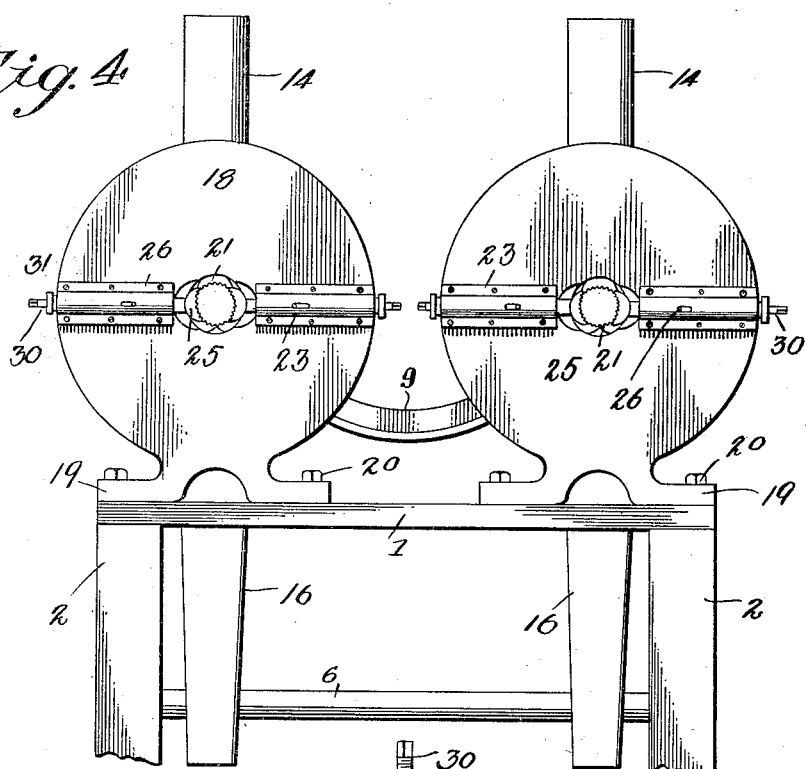
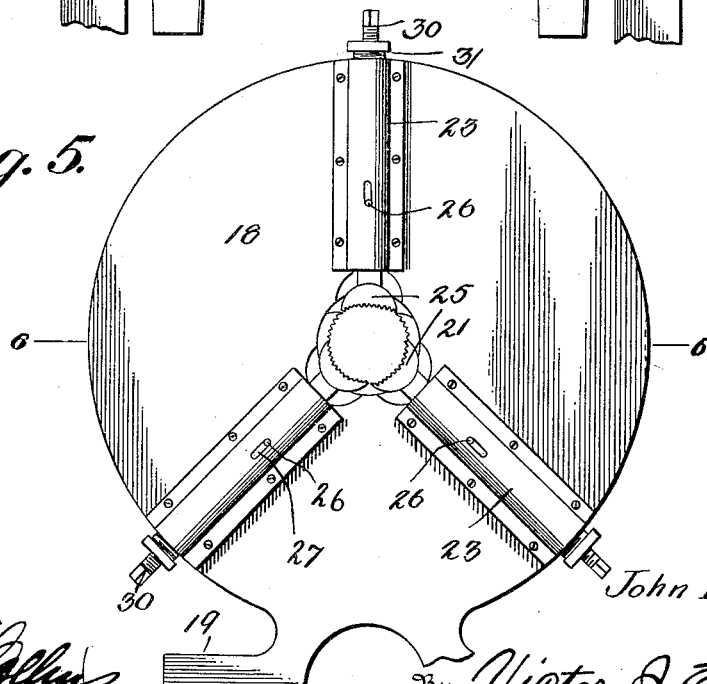

JOHN KIOVSKY, OF ASTORIA, NEW YORK, ASSIGNOR OF TWO-THIRDS TO RICHARD KIOVSKY, OF SPRINGFIELD, MASSACHUSETTS, AND FRANK KIOVSKY, OF NEW YORK, N. Y.

CORN-SHELLER.

1,104,677.	Specification of Letters Patent.	Patented July 21, 1914.

Application filed August 14, 1912. Serial No. 715,088.

*To all whom it may concern:*

Be it known that I, JOHN KIOVSKY, a citizen of the United States, residing at Astoria, Long Island, in the county of Queens and State of New York, have invented new and useful Improvements in Corn-Shellers, of which the following is a specification.

This invention relates to corn shellers, and it has for its object to produce a simple and efficient machine of this class which shall be double acting, that is to say, which shall be provided with two hoppers for the reception of ear corn, and earn projecting pistons operating alternately in said hoppers.

A further object of the invention is to provide shelling chucks or heads of simple and improved construction for removing the kernels from the ears as they are being projected from the hoppers.

A still further object of the invention is to simplify and improve the construction and arrangement of the operating mechanism of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a machine constructed in accordance with the invention. Fig. 2 is a side elevation of the same. Fig. 3 is a longitudinal vertical sectional view taken on the line 3—3 in Fig. 1. Fig. 4 is a rear end elevation. Fig. 5 is a front elevation of one of the shelling heads or chucks detached. Fig. 6 is a sectional view through said head taken on the line 6—6 in Fig. 5. Fig. 7 is a sectional detail of the outer end of one of the shelling members. Fig. 8 is a detail view of one of the ear engaging members.

Corresponding parts in the several figures are denoted by like characters of reference.

The frame 1 of the improved machine, which is of substantially rectangular shape, may be provided with legs or supporting members 2 at the corners thereof. Said frame is provided adjacent to what will be regarded as its front end with bearings for a main driving shaft 3 which may be rotated by hand, by means of a suitable crank, or by power derived from any suitable source. The shaft 3 is provided with cranks 4, 4.

The side members of the frame 1 are provided with downwardly extending brackets 5 supporting a transverse shaft 6. Fulcrumed upon the shaft 6 are levers or arms 7 which are connected by means of links 8 with the cranks 4 on the driving shaft 3. The cranks 4 are disposed to project in diametrically opposite directions, and the swinging movement imparted to the two levers 7 will thus be in opposite directions. The frame 1 supports upwardly extending brackets 9 that extend across the frame and are provided with bearings 10 wherein two piston rods 11 are mounted slidably for reciprocation, said piston rods being disposed in substantially parallel relation to each other. Each of the piston rods 11 carries a boxing 12 engaged by an anti-friction head 13 on one of the arms or levers 7 so that when said arms or levers are operated by means of the driving shaft 3 and the connecting rods 8 the piston rods 11 will be reciprocated in opposite directions.

Suitably mounted on the frame adjacent to the rear end of the latter are hoppers 14 which are of such dimensions as to accommodate a single ear of corn of average size lengthwise therein, each hopper being preferably made of suitable dimensions to accommodate a tier or stack of from six to eight ears of corn. Each of the hoppers has a foraminous bottom 15 through which grains of corn that become detached from the ears within the hopper may pass to a discharge chute 16. The rear wall of each hopper is provided adjacent to the bottom thereof with an opening 17 of suitable dimensions to admit of the passage of a single ear of corn.

Supported on the frame 1 in rear of each of the hoppers 14 is a shelling head or chuck consisting of a casting 18 having feet 19 for the passage of fastening members, such as bolts 20. Each of the shelling heads has a central aperture 21 for the passage of the cob, and each of said heads is provided on the front and rear sides thereof with radial grooves 22 and with caps 23 which are bolted or otherwise secured adjacent to said grooves and which coöperate with said grooves to form guideways for the shelling members 24. It will be observed that the front side or face of each chuck or head is provided with three equidistantly disposed radial guideways, while the rear face of each chuck or head is provided with two guideways that are disposed on diametrically opposite sides of the central aperture. The shelling members consist of stems provided at their inner ends with arcuate toothed jaws 25 that serve to detach the seeds from the cob, the slidable movement of said stems in their respective grooves being limited by means of pins 26 that extend through slots 27 in the caps 23. The stem of each shelling member has a longitudinal bore or recess 28 wherein is placed a spring 29 serving to actuate the shelling member in an inward direction, said spring being compressible by a set screw 30 operating through a lug 31 formed at the outer end of the groove or guideway wherein the shelling member operates. It will be seen that by means of the set screws the pressure of the shelling members in the direction of the ears that are to be operated upon may be gaged or regulated. It will be seen that the arcuate jaws of the shelling members on the rear side of each head or chuck will overlap the gaps between the arcuate jaws of the shelling members on the front side of such chuck, thus causing the entire circumference of an ear of corn that is projected through the aperture 21 to be engaged by the jaws of the shelling members. Shields or guards 32 may be arranged between the rear walls of the hoppers and the front faces of the heads or chucks above the central apertures of the latter.

Each of the piston rods carries an ear engaging head 33, the same being loosely connected therewith by means of springs 34. The head of each piston rod is adapted to engage the lowermost ear in the respective hoppers, and to project the same through the apertures 17 in the rear walls of the hoppers and through the apertures 21 of the shelling heads, thereby causing the seeds to be removed from the cobs, which latter drop in rear of the frame of the machine while the seeds are discharged over the chute 16 into some suitable receptacle provided for the purpose. The heads 33 are provided with bell mouthed ends which engage the ears and consequently the ears are moved with their axes approximately in alinement with the center of the opening between the jaws 25. Furthermore the upper portions of the heads 33 extend beyond the lower portions thereof as shown in Fig. 8 and consequently the ends of the ears which are engaged by the heads 33 are prevented from tending to move in an upward direction as the ears are forced between the jaws 25. At the same time the said ears can not move in a downward direction for the reason that they are in contact with the bottom 15 of the hopper.

From the foregoing description taken in connection with the drawings hereto annexed, the operation and advantages of this invention will be readily understood. When the machine is operated by power, the hoppers may be fed by one man, and the operation of shelling the corn will be quickly and efficiently performed. In the absence of mechanical power, the machine may be manually driven by an additional operator.

Having thus described the invention, what is claimed as new, is:—

1. In a corn sheller, a hopper having an opening in its side, a shaft mounted for reciprocation in the hopper in alinement with the opening and a spring pressed head slidably mounted on the shaft, and having a bell mouthed end portion which normally lies in advance of the end of the shaft and which is adapted to resiliently present the ears of corn to the sheller.

2. In a corn sheller, a hopper having an opening in its side, a shaft mounted for reciprocation in the hopper in alinement with the opening and a spring pressed head slidably mounted upon the shaft and having a bell mouthed end portion which normally lies in advance of the head of the shaft and which is adapted to resiliently present the ears of corn to the sheller, the upper part of the said bell mouthed portion extending beyond the lower part of the same.

In testimony whereof I affix my signature in presence of two witnesses.

JOHN KIOVSKY.

Witnesses:
Jos. A. Knedlhaus,
Hugo Schlica.